United States Patent [19]

Ogata

[11] Patent Number: 4,731,681
[45] Date of Patent: Mar. 15, 1988

[54] VERTICAL MAGNETIC RECORDING AND PLAYBACK APPARATUS

[75] Inventor: Haruki Ogata, Sagamihara, Japan

[73] Assignee: Victor Company of Japan, Limited, Yokohama, Japan

[21] Appl. No.: 841,484

[22] Filed: Mar. 19, 1986

[30] Foreign Application Priority Data

Mar. 23, 1985 [JP] Japan ............ 60-59099

[51] Int. Cl.$^4$ .................................. G11B 5/027
[52] U.S. Cl. ................................. 360/85; 360/84; 360/107
[58] Field of Search .............. 360/84, 85, 95, 107, 360/108

[56] References Cited

U.S. PATENT DOCUMENTS 4,636,886 1/1987 Schwarz ................ 360/84
4,642,711 2/1987 Yunoki et al. .......... 360/84

FOREIGN PATENT DOCUMENTS 1149390 5/1983 Fed. Rep. of Germany ...... 360/119

Primary Examiner—John H. Wolff
Attorney, Agent, or Firm—Jordan and Hamburg

[57] ABSTRACT

A vertical magnetic recording and playback apparatus in which a magnetic tape is transported between a main and an auxiliary magnetic poles of a vertical magnetic head for recording and reproducing information into and out of the tape. The magnetic head is integrally mounted on rotary members. Guide members guide the tape such that the tape is transported in a flat position between the main and auxiliary magnetic poles of the head. In this configuration, the transport of the tape between the main and auxiliary magnetic poles is uncomplicated and the path of tape, simple.

15 Claims, 18 Drawing Figures

VERTICAL MAGNETIC RECORDING AND PLAYBACK APPARATUS

BACKGROUND OF THE INVENTION

The present invention relates to a vertical magnetic recording and playback apparatus and, more particularly, to a vertical magnetic recording and playback apparatus in which a magnetic tape is transported between a main and an auxiliary magnetic poles of a vertical magnetic head for vertically recording and reproducing signals in and out of the tape.

A prior art magnetic recording and playback apparatus of the type described is disclosed in, for example, Japanese Patent Application No. 59-31087/1984 entitled "Magnetic Recording and Playback Apparatus". Where the disclosed type of apparatus is applied to a video tape recorder, for example, which is adapted to record and reproduce signals which lie in a high frequency range, a vertical magnetic head which is made up of a main and an auxiliary magnetic poles and a magnetic tape need to be constantly driven at a high relative speed. To meet this requirement, the magnetic head in accordance with the prior art apparatus is situated near the outer periphery of a rotary guide drum, while a magnetic tape is transported wrapping around the guide drum.

The prerequisite with the above-stated prior art apparatus is that in order that the tape may be transported between the main and auxiliary magnetic poles of the head, which is substantially U-shaped, the tape be passed over the guide drum obliquely upwardly and then obliquely downwardly in a generally U-configuration. In practice, however, transporting the tape in such a configuration around the guide drum cannot be implemented without resorting to a complicated tape transport path. In addition, since the tape is transported wrapping obliquely around the guide drum, the vertical dimension of the guide drum and, therefore, that of the whole apparatus cannot be reduced beyond a certain limit.

SUMMARY OF THE INVENTION

It is therefore an object of the present invention to provide a vertical magnetic recording and playback apparatus which eliminates the problems particular to the prior art apparatus as discussed above.

It is another object of the present invention to provide a vertical magnetic recording and playback apparatus which simplifies a tape transport path to free a magnetic tape from excessive strain, thereby maintaining a high relative speed between the tape and a magnetic head.

It is another object of the present invention to provide a vertical magnetic recording and playback apparatus which reduces the vertical dimension of the head and, thereby, achieves a thin configuration as a whole.

It is another object of the present invention to provide a generally improved vertical magnetic recording and playback apparatus.

A vertical magnetic recording and playback apparatus of the present invention comprises a head drive arrangement supporting a vertical magnetic head which is made up of a main magnetic pole and an auxiliary magnetic pole positioned to face the main magnetic pole, and a tape guide arrangement for guiding a magnetic tape through a gap between the main and the auxiliary magnetic poles while causing one of opposite surfaces of the tape to face the main magnetic pole and the other the auxiliary magnetic pole.

In accordance with the present invention, in a vertical magnetic recording and playback apparatus wherein a magnetic tape is transported between a main and an auxiliary magnetic poles of a vertical magnetic head for recording and reproducing signals in and out of the tape, the magnetic head is integrally mounted on rotary members. Guide members guide the tape such that the tape is transported in a flat position between the main and auxiliary magnetic poles of the head. In this configuration, the transport of the tape between the main and auxiliary magnetic poles is uncomplicated and the path of tape, simple.

The above and other objects, features and advantages of the present invention will become more apparent from the following detailed description taken with the accompanying drawings.

DESCRIPTION OF THE PREFERRED EMBODIMENTS

While the vertical magnetic recording and playback apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
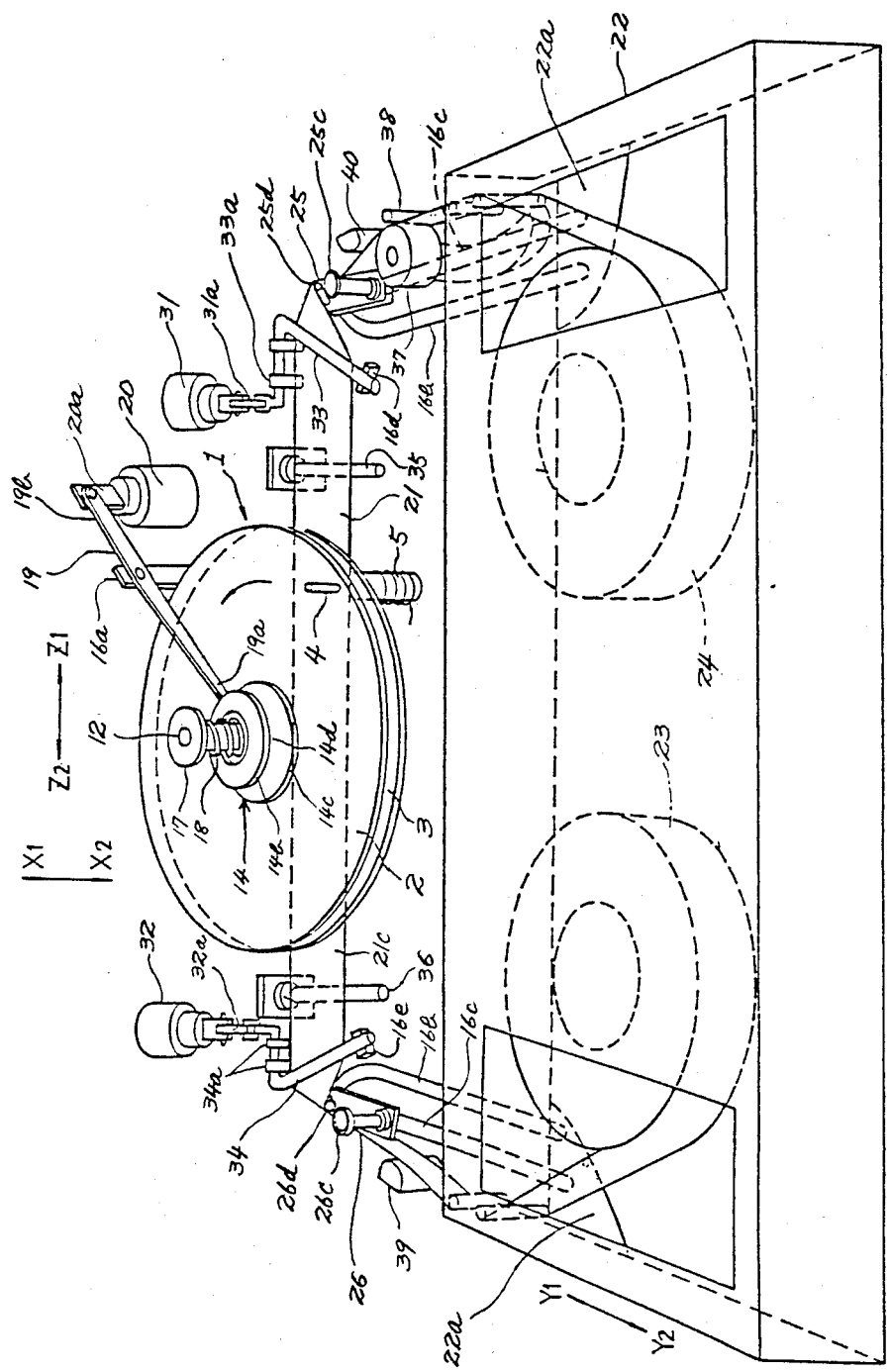
FIG. 1 is a perspective view of a vertical recording and playback apparatus embodying the present invention.
Figure 2:
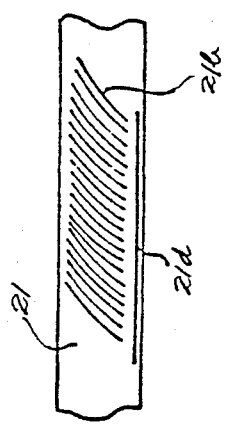
FIG. 2 shows a track pattern which is recorded in a magnetic tape by the apparatus of FIG. 1.

Referring to FIG. 1 of the drawings, a vertical magnetic recording and playback apparatus embodying the present invention is shown. The apparatus includes a rotary head assembly, generally 1, which consists of a pair of disks 2 and 3 which are positioned to face each other, and a main magnetic pole 4 and an auxiliary magnetic pole 5 of a vertical magnetic head which are mounted on the disks 2 and 3, respectively. In a recording or a playback mode operation, the upper disk 2 is lowered as indicated by an arrow $X_2$ to a position close to the lower disk 3. In this position of the disk 2, the main pole 4 faces the auxiliary pole 5 on the disk 3 in the vicinity of the latter. In the recording or the playback mode operation, the disks 2 and 3 are integrally rotated counterclockwise as viewed in FIG. 1, while a magnetic tape 21 is transported as indicated by an arrow $Z_1$. Specifically, the tape 21 is transported in a flat position through the clearance between the upper and lower disks 2 and 3 with a magnetic layer thereof facing the main pole 4 and a base thereof facing the auxiliary pole 5. In this condition, the tape 21 is allowed to move smoothly past the head and, therefore, at a high speed relative to the head. The tape 21 comes into alignment with the main and auxiliary poles 4 and 5, which respectively are rotating integrally with the disks 2 and 3, at the inlet side and the outlet side of the disks 2 and 3, signals being recorded vertically in the tape 21 at the outlet side only. As a result, arcuate tracks 21b are sequentially recorded in the magnetic layer of the tape 21, as shown in FIG. 2.

As described above, the tape 21 is transported in a flat position between the disks 2 and 3 which are located one above the other. This cuts down the vertical dimension of the head assembly 1 and, therefore, the total vertical dimension of the apparatus.

Figure 3:
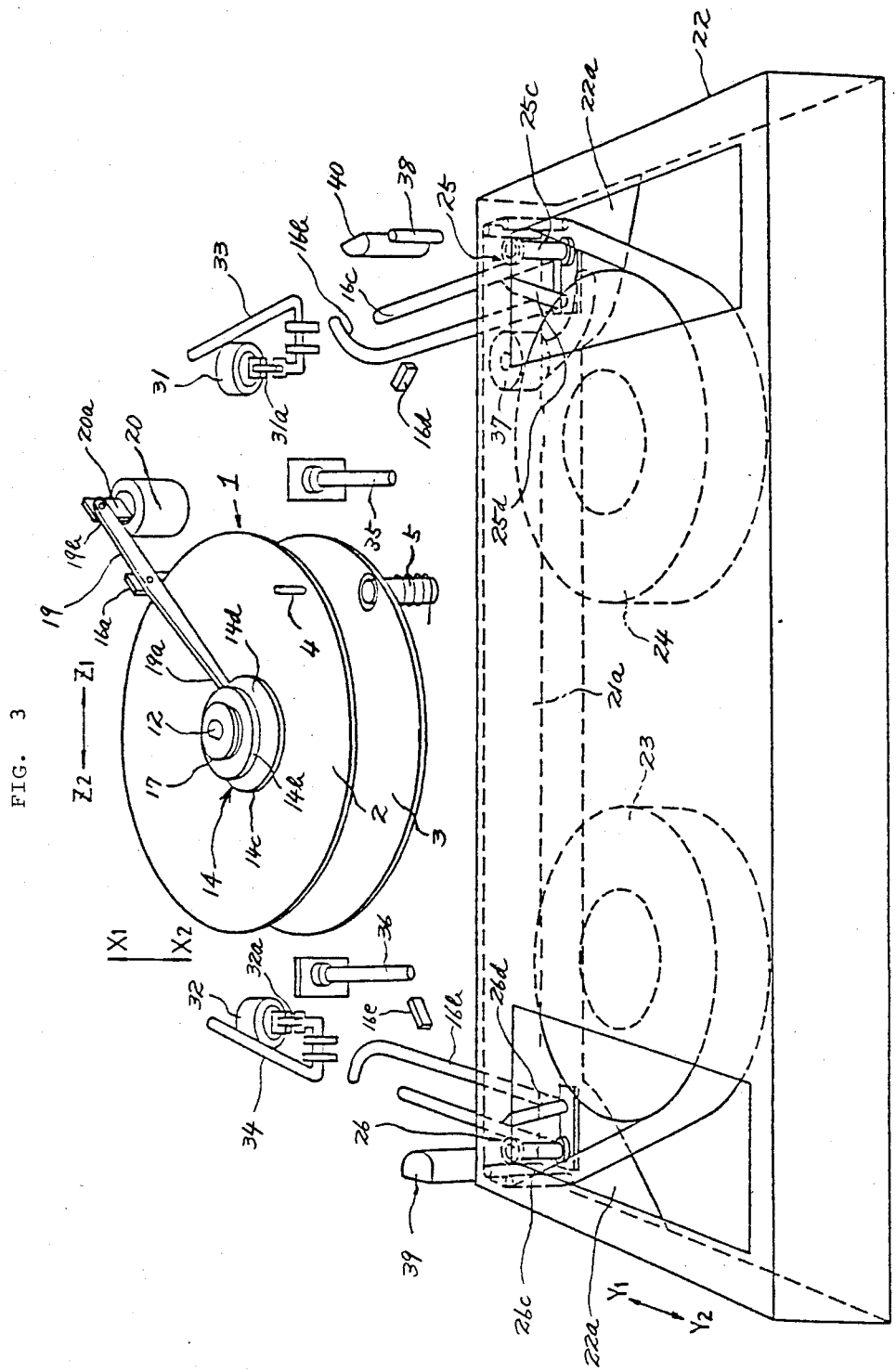
FIG. 3 is a perspective view showing the apparatus of FIG. 1 in a condition before a tape loading operation.

As shown in FIG. 3, before a tape loading operation, the upper disk 2 is held in a raised position as indicated by an arrow $X_1$ where it is spaced apart from the lower disk 3 to facilitate tape loading.

Figure 4:
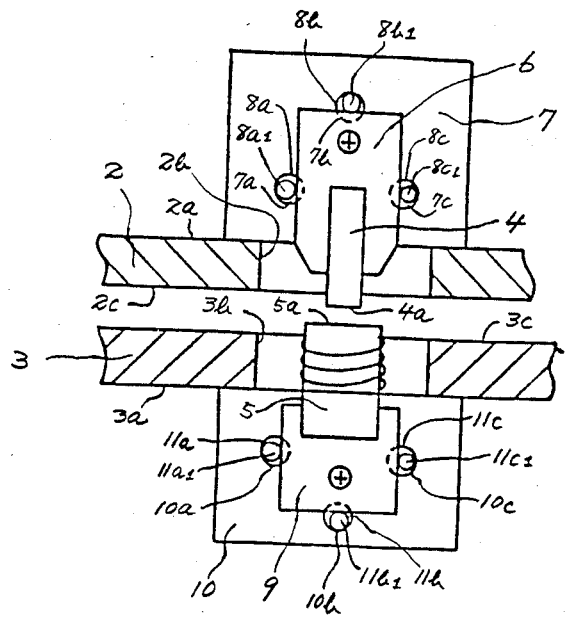
FIGS. 4 and 5 respectively are a front view and a side elevation of a main and an auxiliary magnetic poles mounted on disks which are included in the apparatus of FIG. 1.
Figure 5:
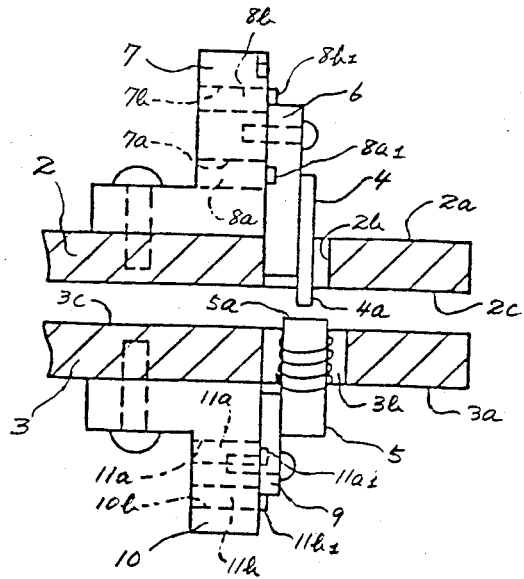

Referring to FIGS. 4 and 5, the main magnetic pole 4 is rigidly supported by a flat, head support 6 which is in turn supported by a generally L-shaped support member 7, which is in turn fastened to the upper surface 2a of the upper disk 2 by screws. The disk 2 is formed with a through opening 2b. The magnetic pole 4, together with the head support 6, is retained in such a position as to be received in the through opening 2b. Formed through the support member 7 are apertures 7a, 7b and 7c in which adjusting members 8a, 8b and 8c respectively are received. The adjusting members 8a, 8b and 8c respectively are provided with eccentric lugs $8a_1$, $8b_1$ and $8c_1$ which abut against the head support 6. The members 8a, 8b and 8c are manipulatable to displace their eccentric lugs $8a_1$, $8b_1$ and $8c_1$ to such a position that the free end 4a of the magnetic pole 4 slightly projects downwardly from the lower surface 2c of the disk 2 through the opening 2b.

The auxiliary magnetic pole 5, on the other hand, is rigidly fitted to a head support 9 which is in turn fixedly connected to a generally L-shaped support member 10, which is in turn fastened to the lower surface 3a of the disk 3 by screws. The support member 7, like the support member 10, is provided with apertures 10a, 10b and 10c in which adjusting members 11a, 11b and 11c respectively are received. The disk 3 is formed with a through opening 3b in alignment with the through opening 2b of the disk 2. The members 11a, 11b and 11c are manipulatable such that the magnetic pole 5 is maintained in the opening 3b with its free end 5a projecting upwardly from the upper surface 3c of the disk 3. In this construction, as the disk 2 is lowered in the direction $X_2$ after a tape loading operation, the main pole 4 is brought to the vicinity of and faces the auxiliary pole 5 to become ready for vertical recording. It will be noted that the auxiliary pole 5, like the main pole 4, is adjusted to the above-mentioned position by rotating the adjusting members 11a, 11b and 11c in their associated apertures 10a, 10b and 10c, the adjusting members 11a, 11b and 11c being provided with eccentric lugs $11a_1$, $11b_1$, $11c_1$, respectively.

Figure 6:
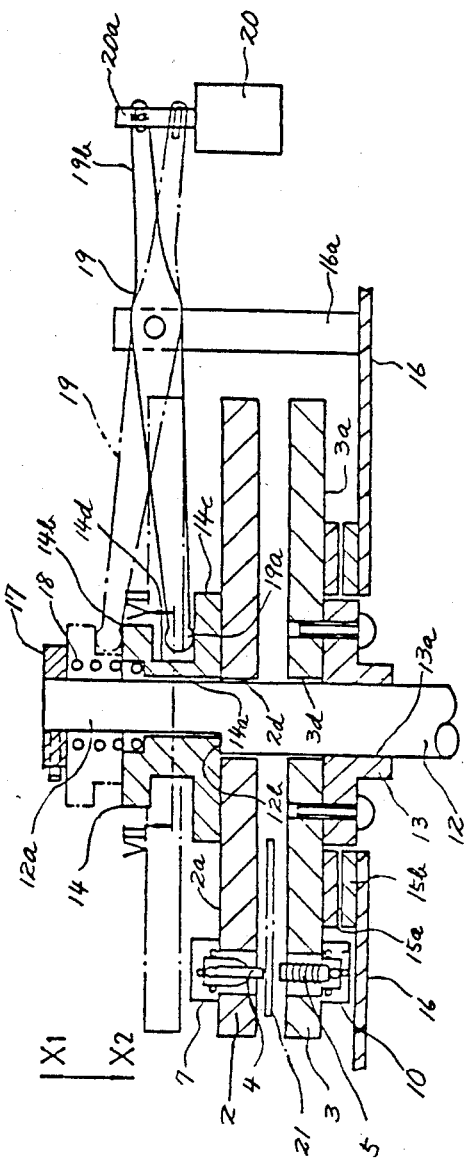
FIG. 6 is a vertical section of a rotary head arrangement installed in the apparatus of FIG. 1.

As shown in FIG. 6, a shaft 12 is provided for rotating the upper and lower disks 2 and 3. Specifically, the shaft 12 is rigidly received in an opening 13a formed through a member 13 to which the disk 3 is fastened. The shaft 12 extends upwardly through a center opening 2d of the disk 2, a center opening 3d of the disk 3, and an opening 14a which is formed through a member 14 situated on the disk 2. The annular member 13, which is adapted to rigidly mount the disk 3 to the shaft 12 as mentioned above, carries a rotary transformer half 15a on the lower surface 3a thereof. During recording or playback, a signal applied to or developed from the auxiliary magnetic pole 5 is transmitted through the rotary transformer half 15a on the disk 3 to the other rotary transformer half 15b, which is provided on a chassis 16. The member 14 is rigidly mounted on the upper surface 2a of the disk 2 and provided with an upper flange 14b, a lower flange 14c, and an annular recess or groove 14d defined by the flanges 14b and 14c.

Figure 7:
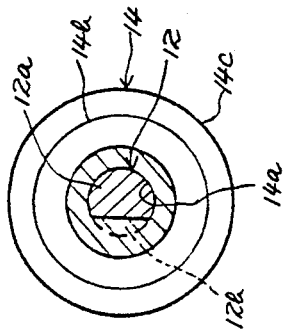
FIG. 7 is a section along line VII—VII of FIG. 6 and showing a shaft of the head arrangement.

As shown in FIGS. 6 and 7, the shaft 12 includes a slide portion 12a having a generally D-shaped cross-section which is formed by partly removing notching the upper outer periphery of the shaft 12. The opening 14a of the recessed member 14 is D-shaped complimentarily to the slide portion 12a. The slide portion 12a which is received in the opening 14a of the member 14 allows the disk 2 to rotate integrally with the shaft 12 and disk 3. A spring retainer 17 is coupled over and fastened to the upper end of the shaft 12, while a coil spring 18 is loaded between the spring retainer 17 and the recessed member 14. In this configuration, the disk 2 is constantly biased by the spring 18 in the direction $X_2$.

In FIG. 6, a rocker lever 19 is rockably mounted to a post 16a which extends upwardly from the chassis 16. The rocker lever 19 is received in the groove 14d of the member 14 at one end portion 19a thereof and operatively connected to a plunger 20a of a solenoid 20 at the other end portion 19b. Before a tape loading operation, as the solenoid 20 is energized, its plunger 20a is displaced in the direction $X_2$ to in turn rotate the rocker lever 19 clockwise on the post 16a. The member 14, therefore, is caused to slide on and along the slide portion 12a of the shaft 12 in the direction $X_1$ against the action of the spring 18, lifting the disk 2 away from the disk 3 to a phantom line position as shown in FIG. 6. As described later in detail, after a tape loading operation, the member 14 is urged by the spring 18 in the direction $X_2$ to move along the slide portion 12a of the shaft 12 toward the disk 3 down to a solid line position. Such a downward displacement of the disk 2 is limited by a shoulder 12b of the shaft 12 against which the underside of the member 14 abuts.

By the above procedure, in a recording and playback mode, the disk 2 is lowered to bring the main magnetic pole 4 close to the auxiliary magnetic pole 5 and, in this condition, the disks 2 and 3 are rotated integrally with each other. While the tape 21 is transported between the tip 4a of the pole 4 and the tip 5a of the pole 5, tracks 21b are sequentially recorded in the magnetic layer of the tape 21 by vertical magnetic recording, as shown in FIG. 2.

The apparatus having the above construction will be operated as follows when a tape cassette is loaded for the recording or playback purpose.

Figure 8A:
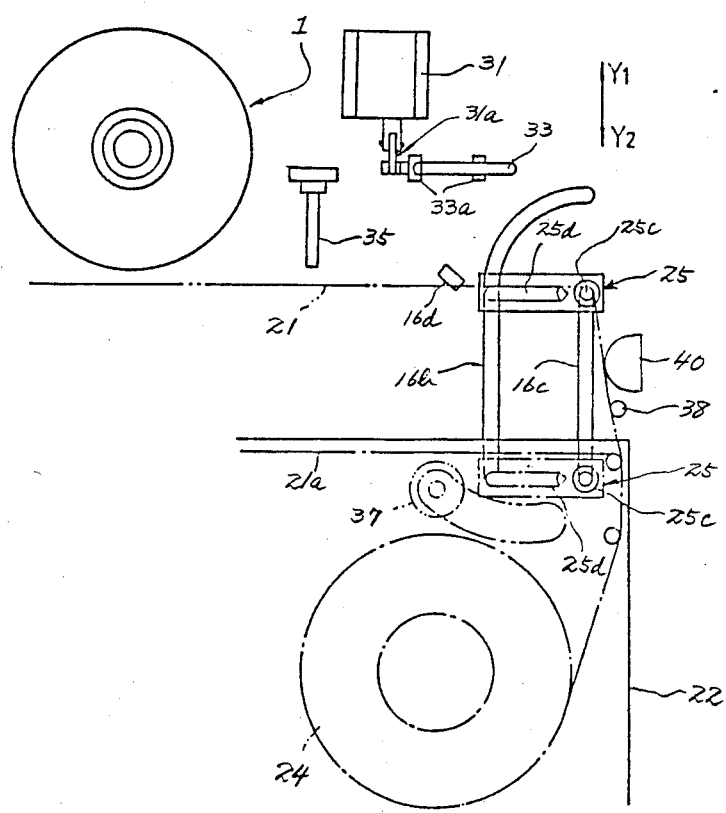
FIGS. 8A and 8B are plan views demonstrating a tape loading operation.
Figure 9A:
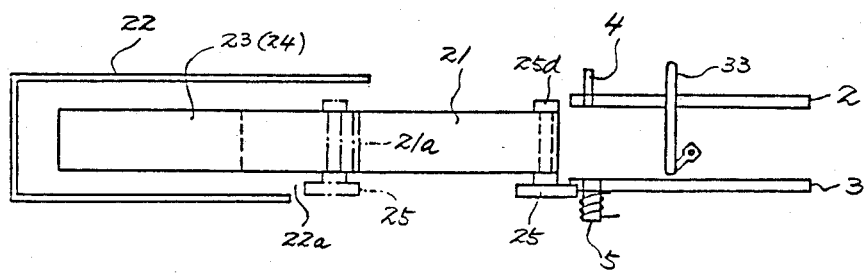
FIGS. 9A to 9D are side elevations also showing the tape loading operation.

As shown in FIGS. 1, 8A and 9A, as a tape cassette 22 is loaded in the apparatus, tape loading members 25 and 26 are admitted into the cassette 22 through bottom openings 22a of the cassette 22 beyond a front tape path 21a, which extends between a supply reel 23 and a take-up reel 24. Since mechanisms for actuating the tape loading members 25 and 26 are independent of each other but identical in construction, the following description will concentrate to the right tape loading member 25 and its associated actuating mechanism.

Figure 10A:
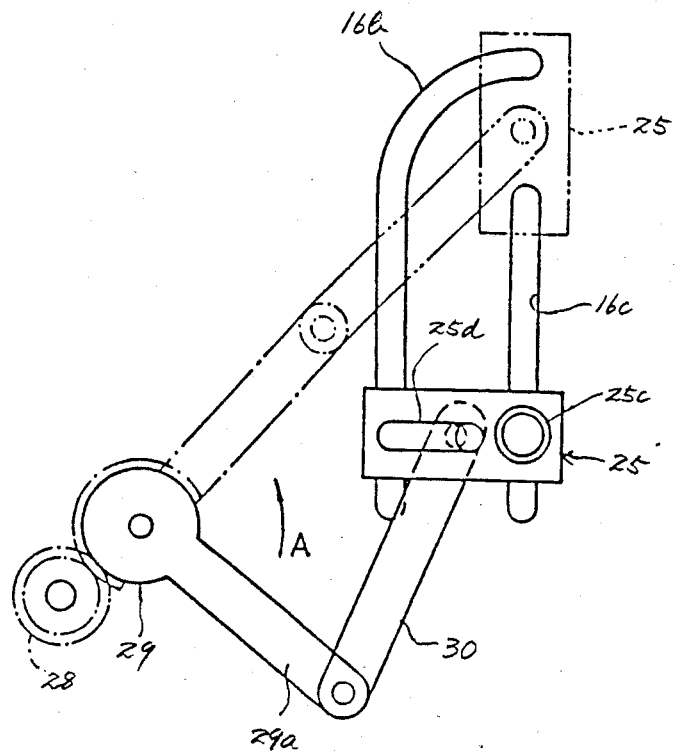
FIGS. 10A and 10B respectively are a plan view and a sectional view of a tape loading mechanism which is built in the apparatus of FIG. 1.
Figure 10B:
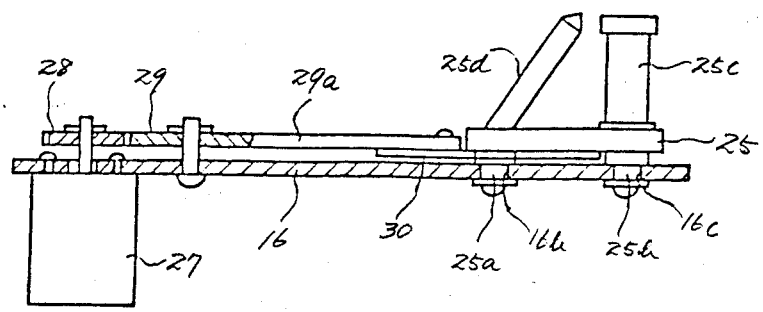

As shown in FIGS. 10A and 10B, in the event of tape loading operation, a motor 27 is energized to rotate a drive gear 28 which in turn rotates a loading gear 29 as indicated by an arrow A. The tape loading member 25 is provided with rollers 25a and 25b on the underside thereof which respectively are movably received in guide slots 16b and 16c of the chassis 16. An arm 29a extends out from the loading gear 29 to be articulated to one end of a loading arm 30 the other end of which is engaged with the center of the underside of the member 25. When the loading arm 30 is driven by the motor 27, it urges the member 25 away from a standby position as indicated by an arrow $Y_1$ in FIG. 8A. Specifically, as shown in FIGS. 8A and 9A, the member 25 is moved from the standby position as indicated by a phantom line along the guide slots 16b and 16c, until a guide roller 25c and an inclined pole 25d abut against the front tape path 21a. The tape 21 is drawn out of the tape cassette 22 in the direction $Y_1$ by such a displacement of the tape loading member 25.

Figure 8B:
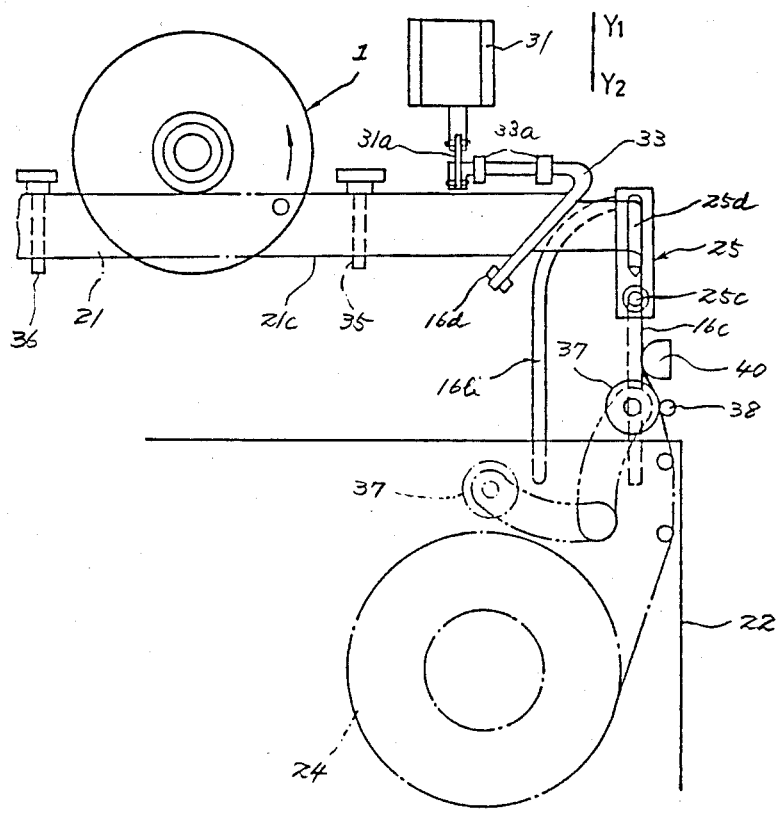
Figure 9B:
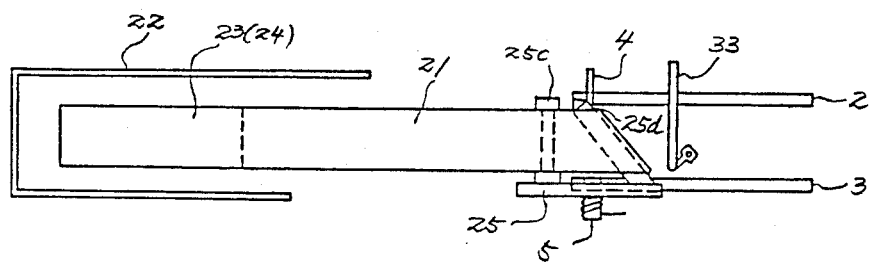

Next, as shown in FIGS. 8B, 9B and 10B, as soon as the tape loading member 25 is moved until the roller 25b situated beneath the guide roller 25c abuts against the end of the guide slot 16c, the roller 25a beneath the inclined pole 25d rolls along an arcuate part of the guide slot 16b causing the member 25 to make a substantially 90-degrees turn. This causes the inclined pole 25d to angularly direct in the direction $Y_1$, guiding the tape 21 to between the disks 2 and 3 while maintaining it inclined.

Figure 9C:
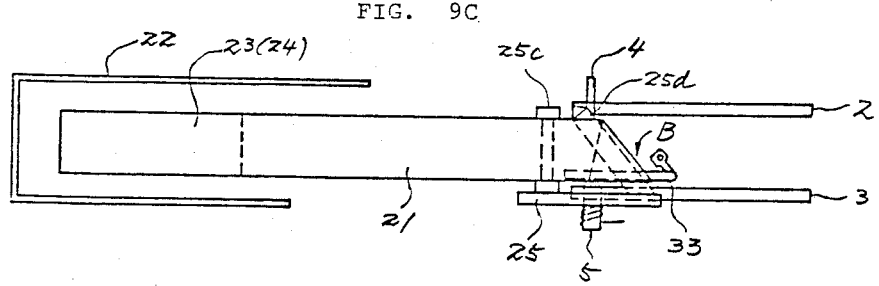

Subsequently, as shown in FIGS. 8A and 8B, a plunger 31 is energized to move a connecting member 31a as indicated by an arrow $Y_2$ so that a rotatable inclined pole 33 is rotated from an upright position thereof as indicated by an arrow B in FIG. 9C. The pole 33 which is journalled to the chassis 16 by a bearing 33a is stopped in a horizontal position as its free end abuts against a stop 16d. While the pole 33 is moved to the horizontal position, the tape 21 which is held in an inclined position by the pole 25d of the member 25 is brought to a flat position with its magnetic layer facing upward. As a result, the tape 21 forms a horizontal tape path 21c as shown in FIGS. 8B and 9D which is twisted 90 degrees, between the poles 25d and 33 and the poles 26d and 34 which are remote from the poles 25d and 33.

Horizontal poles 35 and 36 which are situated at opposite sides of the disk 3 serve to guide the horizontal tape pass 21c through a predetermined loading position between the opposite magnetic poles 4 and 5 which are mounted on the disks 2 and 3, respectively.

Further, as shown in FIG. 8B, a pinch roller 37 is rotated clockwise to press the tape 21 against a capstan 38. As shown in FIG. 1, a full-width erase head 39 is displaced in the direction $Z_1$ and an audio control head 40 in the direction $Z_2$, until each makes contact with the tape 21.

Figure 9D:
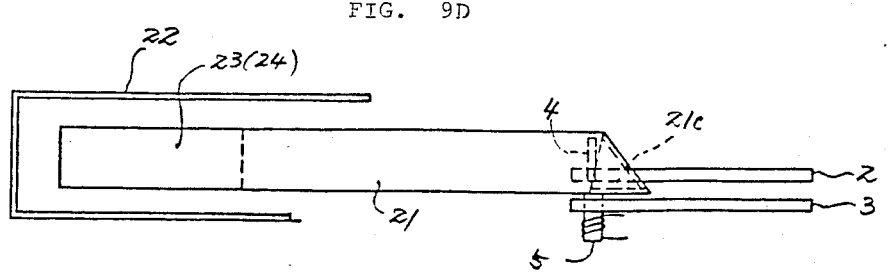

As previously stated and as shown in FIGS. 6 and 9D, the upper disk 2 is lowered in the direction $X_2$ toward the lower disk 3. In this position, the main pole 4 on the disk 2 is ready to perform vertical magnetic recording and playback in cooperation with the auxiliary pole 5, the tape 21 extending between the poles 4 and 5. Specifically, the tape 21 pulled out from the supply reel 23 in the direction $Y_1$ as shown in FIG. 1 is routed through the erase head 39 and the guided by the guide roller 26c, inclined pole 26d and rotatable inclined pole 34 to reach the horizontal tape path 21c. After the transport in the flat position, the tape 21 is admitted into between the disks 2 and 3 and, while it is moved past the poles 4 and 5, information is vertically written therein or read thereoutof. The tape 21 come out of the disks 2 and 3 and moved past the horizontal pole 35 is twisted 90 degrees by the rotatable inclined pole 33 and inclined pole 25d to be guided in the direction $Y_2$ toward the audio control head 40. This head 40 is adapted to record audio signals in an audio track 21d (see FIG. 2) which extends below the arcuate tracks 21b. The tape 21 undergone vertical magnetic recording or playback as described above is pressed by the pinch roller 37 against the capstan 38 and, by the rotation of the capstan 38, taken up on the take-up reel 24.

Figure 11A:
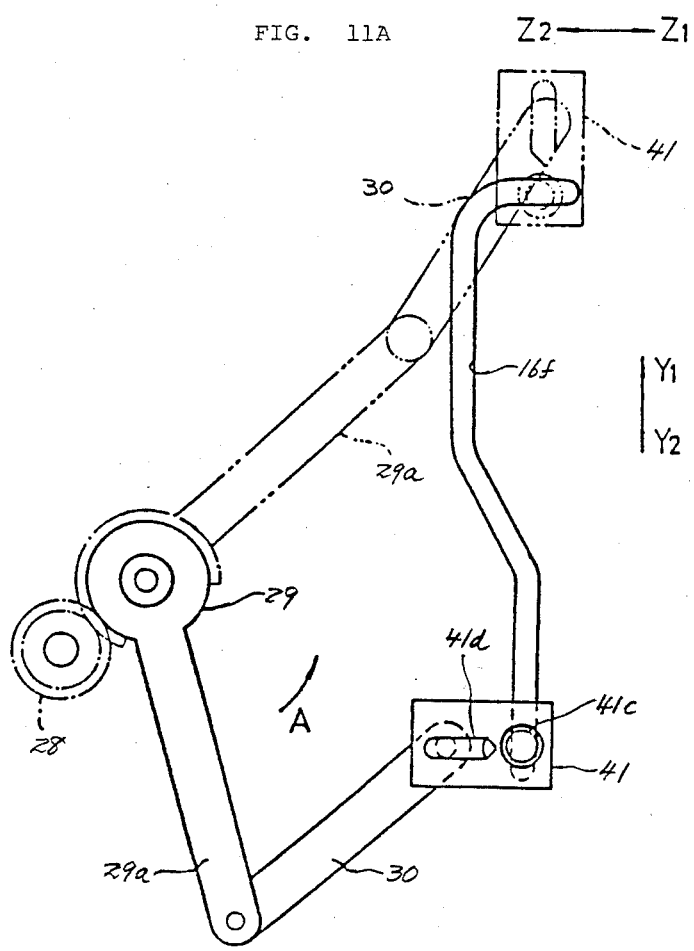
FIG. 11A is a plan view of another possible form of the tape loading mechanism.
Figure 11B:
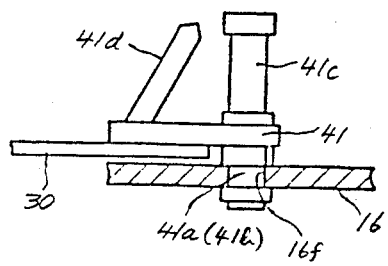
FIGS. 11B and 11C respectively are a front view and a bottom view of a loading member which is included in the mechanism of FIG. 11A.
Figure 11C:
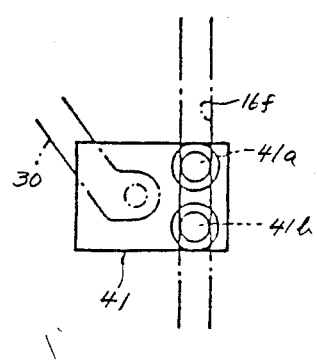

The tape loading member 25 has been shown and described as being guided by the two guide slots 16b and 16c during the movement in the direction $Y_1$ for tape loading. Such is only illustrative and may be replaced by an arrangement shown in FIGS. 11A to 11C. In FIGS. 11A to 11C, the chassis 16 is formed with a single guide slot 16f, while a loading member 41 is provided with two rollers 41a and 41b on the underside thereof. The rollers 41a and 41b are arranged one after the other in a direction perpendicular to the direction in which a guide roller 41c and an inclined pole 41d of the member 41 are arranged. As the arm 29a of the loading gear 29 and the loading arm 30 are displaced driven by the drive gear 28, the member 41 is moved from a standby position (indicated by a solid line) in the direction $Y_1$ guided by the guide slot 16f and, after a clockwise turn of 90 degrees, brought to a loading position (indicated by a phantom line) for performing the tape loading operation.

While the rotary members on which a vertical magnetic head is mounted have been implemented by disks, any suitable configuration other than disks may be employed, if desired. Further, two or more vertical magnetic heads may be mounted on the disks. In addition, a pair of disks may be positioned upright such that a tape extends through the clearance between the facing vertical surfaces of the disks, in which case it is needless to so twist the tape as to direct the magnetic surface of the tape upwardly.

Furthermore, a pair of disks may be used in an inclined position such that a tape is transported therebetween with a magnetic surface thereof inclined.

In summary, it will be seen that the present invention provides a vertical magnetic recording and playback apparatus which allows a magnetic tape to be smoothly transported in a flat position between a main and an auxiliary magnetic poles of a vertical magnetic head. Since the tape moves linearly past the magnetic poles, the route along which the tape is transported is simplified to free the tape from excessive strain, and, hence, vertical magnetic recording and playback is achievable with ease while maintaining a sufficiently high relative speed between the tape and the head. Such is especially desirable for an application of the apparatus to a video tape recorder which records and reproduces signals lying a high frequency range. In addition, rotary members can be positioned horizontally with their rotary surfaces facing upward and downward in order to reduce the vertical dimension of the rotary head arrangement and, thereby, the total thickness of the apparatus.

Various modifications will become possible for those skilled in the art after receiving the teachings of the present disclosure without departing from the scope thereof.

What is claimed is:

1. A vertical magnetic recording and playback apparatus comprising:

head drive means supporting a vertical magnetic head which is made up of a main magnetic pole and an auxiliary magnetic pole positioned to face said main magnetic pole, said head drive means comprising at least a pair of flat rotary members which are positioned to face each other, said flat rotary members comprising a first rotary plate on which the main magnetic pole is mounted and a second rotary plate on which the auxiliary magnetic pole is mounted; and tape guide means for guiding a magnetic tape through a clearance between said main and said auxiliary magnetic poles while causing one of opposite surfaces of the tape to face said main magnetic pole and the other said auxiliary magnetic pole.

2. An apparatus as claimed in claim 1, wherein said head drive means further comprises support means for rigidly mounting said first and said second rotary plates to said main and said auxiliary magnetic poles, respectively, such that the magnetic poles are held in a predetermined positional relationship.

3. An apparatus as claimed in claim 2, wherein the head drive means further comprises adjusting means for varying the positional relationship between the main and the auxiliary magnetic poles.

4. An apparatus as claimed in claim 1, wherein said head drive means further comprises shift means for driving the first and the second rotary plates toward and away from each other.

5. An apparatus as claimed in claim 4, wherein said shift means comprises pressing means which is rigidly mounted on the first rotary plate to move the first rotary plate toward the second rotary plate, and shift control means for moving the first rotary plate away from the second rotary plate by driving said pressing means.

6. An apparatus as claimed in claim 5, wherein said pressing means comprises a recessed member having a first flange which is rigidly connected to the first rotary plate and a second flange which is integral with said first flange and defines an annular recess in cooperation with said first flange, and a spring member for acting on said second flange to bias the first rotary plate toward the second rotary plate.

7. An apparatus as claimed in claim 6, wherein the shift control means comprises a rocker lever which is received at one end thereof in said annular recess of said recessed member, and lever drive means operatively connected to the other end of said rocker lever to drive said rocker lever in an angular motion.

8. An apparatus as claimed in claim 7, wherein said lever drive means comprises plunger means.

9. A magnetic recording and playback apparatus comprising a pair of rotary members which rotate together about a common axis, magnetic head means comprising a first magnetic head part carried by one of said rotary members and a second magnetic head part carried by said other rotary members such that said first and second magnetic head parts rotate together about said common axis, said first and second magnetic head parts being spaced from one another, and tape guide means guiding a magnetic tape through the space between said first and second magnetic head parts such that the plane of the tape as it passes through said space is substantially perpendicular to said common axis, whereby said magnetic head means provides tracks on said tape upon rotation of said first and second magnetic head parts and advancement of said tape through said space.

10. An apparatus as claimed in claim 9, wherein the tape guide means comprises tape loading member means for drawing the tape out of a tape cassette in which the tape is accommodated, and tape loading member drive means associated with said tape loading member means for moving the tape loading member means between a standby position and a loading position.

11. An apparatus as claimed in claim 10, wherein said tape loading member means comprises an inclined pole means for guiding the tape which has been drawn out by said tape loading member means in the loading position to the space between the main and the auxiliary magnetic poles while inclining the opposite surfaces of the tape relative to facing surfaces of the magnetic poles.

12. An apparatus as claimed in claim 11, wherein the tape guide means further comprises a second inclined pole for guiding the tape after passing through the space between the magnetic poles after reorienting the surfaces of the tape, which have been inclined by the first said inclined pole, to a non-inclined orientation relative to the facing surfaces of the magnetic poles.

13. A magnetic recording and playback apparatus according to claim 9, wherein the magnetic apparatus further comprises receiving and accommodating means for receiving and accommodating a supply reel and a take-up reel for said tape with the axes of said supply reel and take up reel being substantially parallel to said common axis.

14. A magnetic recording and playback apparatus according to claim 13, wherein said receiving and accommodating means is constructed to receive a cassette in which said supply and take-up reels are disposed.

15. A magnetic recording and playback apparatus comprising a pair of rotary members axially spaced from one another and rotatable together about a common axis, magnetic head means having a first magnetic head part carried by one of said rotary members and a second magnetic head part carried by the other of said rotary members, said first and second magnetic head parts being spaced from one another, and tape guide means for guiding a magnetic tape, said tape guide means comprising first guide-orienting means for guiding the tape with the plane of the tape oriented parallel to said common axis, said tape guide means further comprising second guide-orienting means for changing the orientation of the tape to provide a tape run in which the plane of the tape is substantially perpendicular to said common axis, said tape run passing through the space between said first and second magnetic head parts, whereby said magnetic head means provides tracks on said tape upon rotation of said rotary members and advancement of said tape run through said clearance between said first and second magnetic head parts.

* * * * *